(12) United States Patent
Deering et al.

(10) Patent No.: US 6,994,376 B1
(45) Date of Patent: Feb. 7, 2006

(54) QUICK RELEASE MUD FLAP APPARATUS

(76) Inventors: Anthony G. Deering, 6610 NE. 21st La., Fort Laudderdale, FL (US) 33308; Crystal J. Narciso-Deering, 6610 NE. 21st La., Fort Laudderdale, FL (US) 33308

(*) Notice: Subject to any disclaimer, the term of this patent is extended or adjusted under 35 U.S.C. 154(b) by 172 days.

(21) Appl. No.: 10/699,341

(22) Filed: Nov. 3, 2003

(51) Int. Cl.
 *B62D 25/18* (2006.01)
(52) U.S. Cl. .................. 280/847; 280/851; 280/154
(58) Field of Classification Search ............... 280/847, 280/848, 851
See application file for complete search history.

(56) References Cited

U.S. PATENT DOCUMENTS

| | | |
|---|---|---|
| 2,683,612 A | 7/1954 | Bachno |
| 3,899,193 A | 8/1975 | Evans |
| 3,934,901 A | 1/1976 | Hammerly |
| 4,627,594 A | 12/1986 | Reed |
| 5,048,868 A * | 9/1991 | Arenhold ............... 280/848 |
| D330,692 S | 11/1992 | Hammond, Jr. |
| 6,116,628 A * | 9/2000 | Adrian ................. 280/154 |
| 6,135,502 A | 10/2000 | Howe et al. |

* cited by examiner

*Primary Examiner*—Christopher P. Ellis
*Assistant Examiner*—Cynthia F. Collado

(57) ABSTRACT

A quick release mud flap apparatus includes a flexible panel having a bottom end and a top end. A rigid bracket is attached to and extends along a length of the top end. Each of a plurality of clamps is attached to the bracket and extends upwardly away therefrom. The clamps each include an actuator for selectively opening or closing the clamps. Each of the clamps are closed when the actuators are in a downward position located generally adjacent to the bracket and open when the actuators are spaced away from the brackets. The clamps are each selectively coupled to a floor rail such that the panel functions as a mud flap. A locking assembly selectively locks the actuators in the downward position.

5 Claims, 3 Drawing Sheets

QUICK RELEASE MUD FLAP APPARATUS

BACKGROUND OF THE INVENTION

1. Field of the Invention

The present invention relates to mud flap devices and more particularly pertains to a new mud flap device for positioning on a floor rail of a truck or trailer.

2. Description of the Prior Art

The use of mud flap devices is known in the prior art. While these devices fulfill their respective, particular objectives and requirements, the need remains for a device that may be quickly retrofitted to any existing mud flap mounting when a mud flap needs to be replaced while on a roadway.

SUMMARY OF THE INVENTION

The present invention meets the needs presented above by providing a plurality of clamps that allows a truck driver to quickly mount a panel to a trailer to replace any damaged or missing mud flaps until the truck driver can have the mud flaps permanently replaced.

Another object of the present invention is to provide a new mud flap device that including a locking assembly for ensuring that the clamps remained in a closed configuration.

To this end, the present invention generally comprises a flexible panel having a bottom end, a top end, a pair of side edges, a first side and a second side. A rigid bracket is attached to and extends along a length of the top end. Each of a plurality of clamps is attached to the bracket and extends upwardly away therefrom. The clamps each include an actuator for selectively opening or closing the clamps. Each of the clamps are closed when the actuators are in a downward position located generally adjacent to the bracket and open when the actuators are spaced away from the brackets. The clamps are each selectively coupled to a floor rail such that the panel functions as a mud flap. A locking assembly selectively locks the actuators in the downward position.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
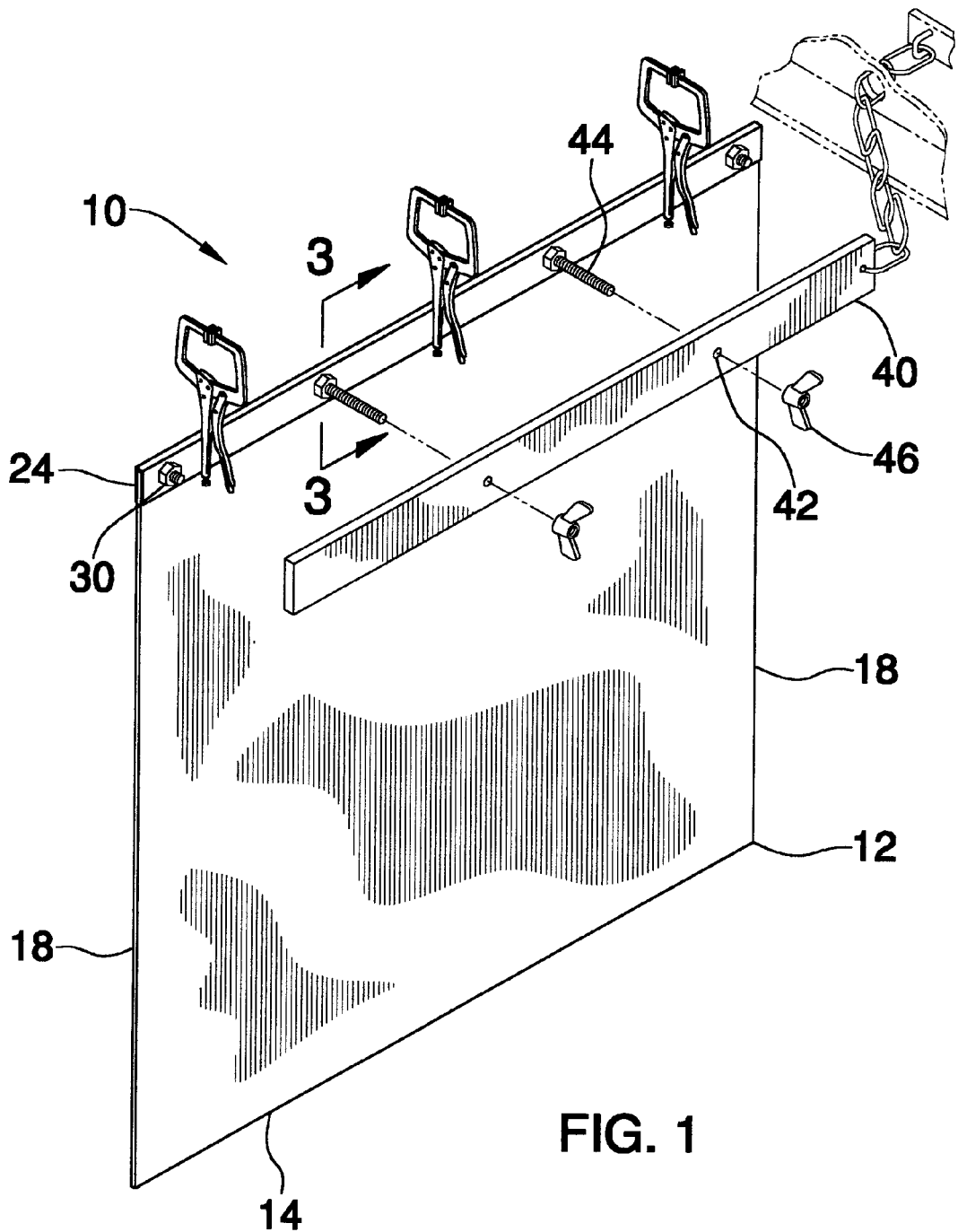
FIG. 1 is a schematic perspective view of a quick release mud flap apparatus according to the present invention.

With reference now to the drawings, and in particular to FIGS. 1 through 4 thereof, a new mud flap device embodying the principles and concepts of the present invention and generally designated by the reference numeral 10 will be described.

As best illustrated in FIGS. 1 through 4, the quick release mud flap apparatus 10 generally comprises a flexible panel 12 that has a bottom end 14, a top end 16, a pair of side edges 18, a first side 20 and a second side 22. The panel 12 is preferably comprised of conventional mud flap materials, such as an elastomeric material.

A rigid bracket 24 is attached to and extends along a length of the top end 16. The bracket 24 has a central portion 26 and a pair of arms 28, 29. The central portion 26 abuts the top end 16 and each of the arms 28, 29 abuts one of the first 20 and second 22 sides. The rigid bracket 24 is preferably comprised of a metallic material and is secured to the rigid bracket with bolts 30.

Each of a plurality of clamps 34 is attached to the bracket 24 and extends upwardly away therefrom. It is preferred that the clamps 34 are welded to the bracket 24. The clamps 34, preferably at least three and spaced from each other, each include an actuator 36 for selectively opening or closing the clamps 34. Each of the clamps 34 is closed when the actuators 36 are in a downward position located generally adjacent to the bracket 24 and open when the actuators 36 are spaced away from the brackets. The clamps 34 are selectively coupled to the floor rail 38, or other suitable mud flap mount, such that the panel 12 hangs in place of a mud flap.

A locking assembly selectively locks the actuators 36 in the downward position to prevent their accidental opening. The locking assembly includes an elongated member 40 having a plurality of spaced apertures 42 extending therethrough. Each of a plurality of threaded posts 44 is attached to and extends outwardly from a first of the arms 28. Each of the posts 44 is orientated perpendicular to a plane of the first arm 28. The posts 44 are each positioned for extending into one of the apertures 42. Each of a plurality of fasteners 46 is removably coupled to one of the posts 44. The fasteners 46 preferably comprise a fly nut such that they may be easily removed from or attached to the posts 44 without tools.

Figure 2:
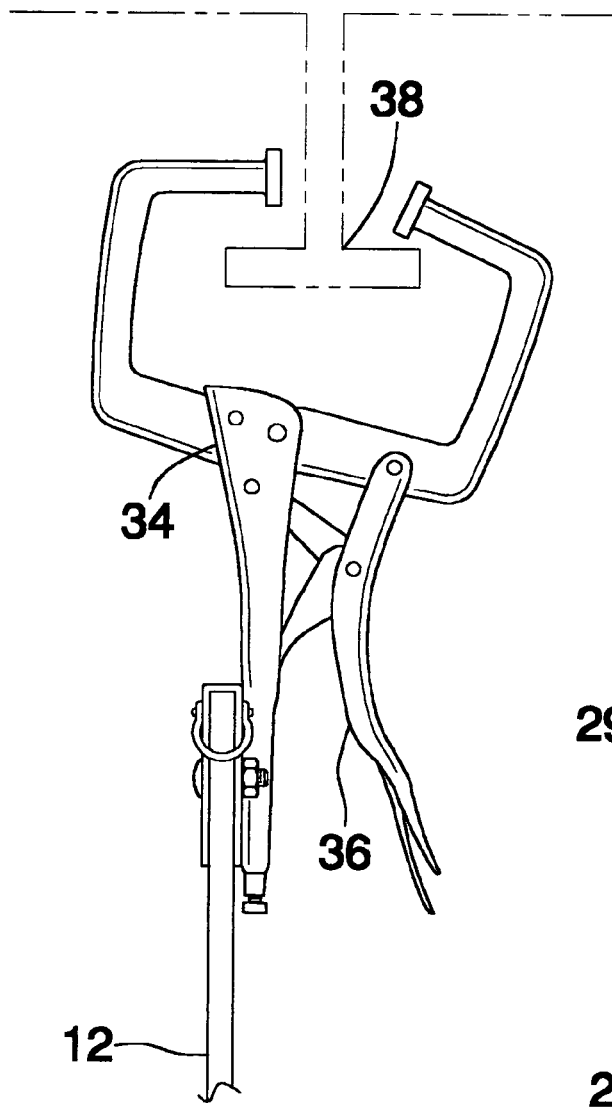
FIG. 2 is a schematic side view of the present invention.
Figure 3:
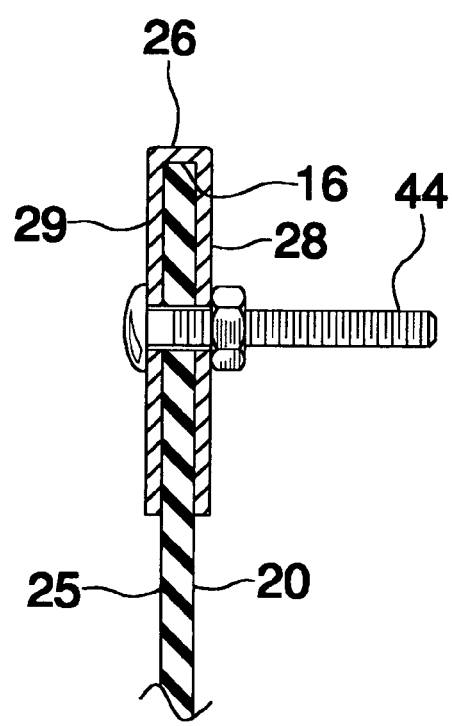
FIG. 3 is a schematic cross-sectional view taken along line 3—3 of FIG. 1 of a post of the present invention.
Figure 4:
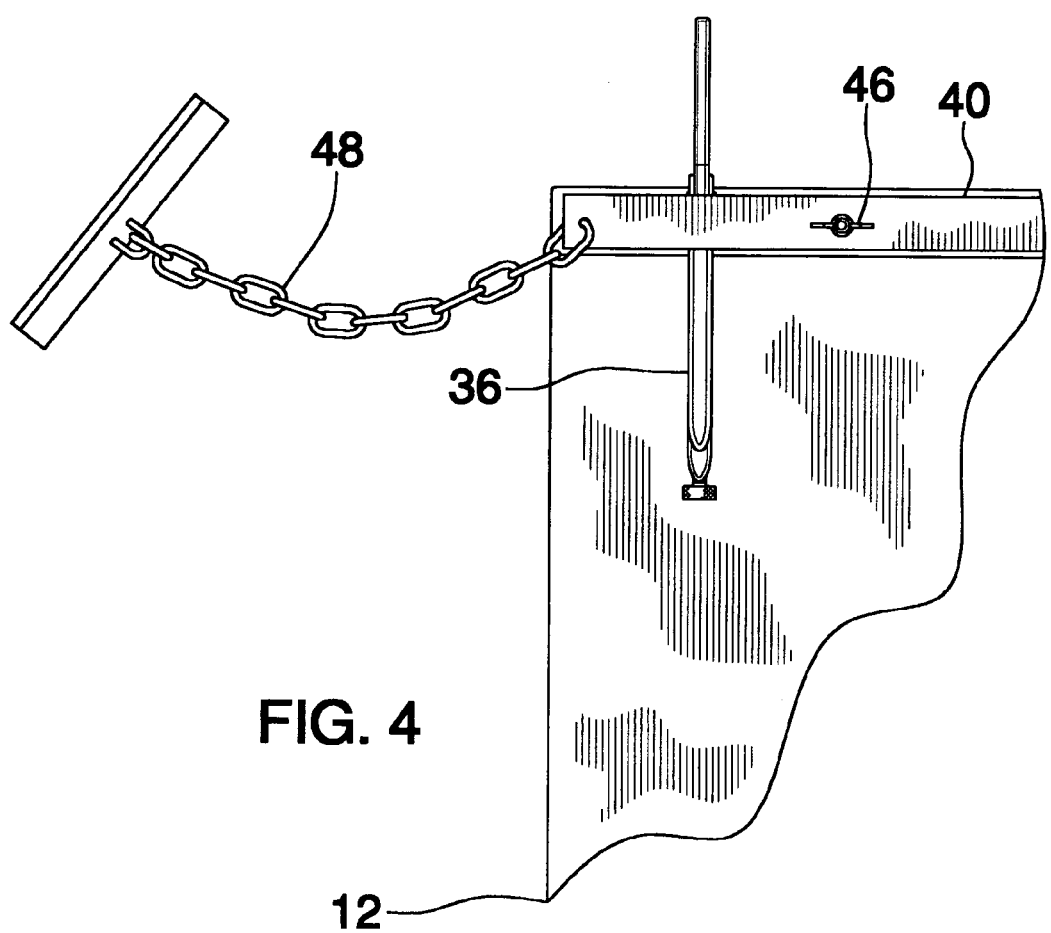
FIG. 4 is a schematic front view of the present invention.

In use, when a truck driver loses a mud flap, the current apparatus 10 may be used until a more permanent mud flap is attached to the floor rail 38 of the truck or the trailer. The clamps 34 are closed on the rail as shown in FIG. 2. The actuator 36 is positioned in a downward position as shown in FIG. 4 such that the actuator 36 is adjacent to the bracket 24. The elongated member 40 is then positioned on the posts 44 so that the actuator 36 is positioned between the elongate member 40 and the bracket 24. The elongated member 40 is may be selectively mounted on and secured to the posts 44 such that the actuators 36 are positioned between the elongated member 40 and the bracket 24. The elongated member 40 prevents the actuators 36 from opening and thereby releasing the panel 12 from the rail 38. The elongated member 40 may optionally be attached to the vehicle or trailer by way of a chain 48 to ensure does not fall away from the vehicle.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

We claim:

1. A quick release mud flap assembly, said assembly being removably attachable to a floor rail of a vehicle, said assembly comprising:
   a flexible panel having a bottom end, a top end, a pair of side edges, a first side and a second side;
   a rigid bracket being attached to and extending along a length of said top end;
   a plurality of clamps, each of said clamps being attached to said bracket and extending upwardly away therefrom, each of said clamps including an actuator for selectively opening or closing said clamps, wherein each of said clamps are closed when said actuators are in a downward position located generally adjacent to said bracket and open when said actuators are spaced away from said brackets, each of said clamps being selectively coupled to the floor rail; and
   a locking assembly for selectively locking said actuators in said downward position.

2. The assembly of claim 1, said bracket having a central portion and a pair of arms, said central portion abutting said top end and each of said arms abutting one of said first and second sides.

3. The assembly of claim 2, wherein said locking assembly includes:
   an elongated member having a plurality of spaced apertures extending therethrough;
   a plurality of threaded posts, each of said posts being attached to and extending outwardly from a first of said arms, each of said posts being positioned for extending into one of said apertures;
   a plurality of fasteners, each of said fasteners being removably coupled to one of said posts, wherein said elongated member may be selectively mounted on and secured to said posts such that said actuators are positioned between said elongated member and said bracket.

4. The assembly of claim 1, wherein said plurality of clamps includes at least three clamps spaced from each other.

5. A quick release mud flap assembly, said assembly being removably attachable to a floor rail or a vehicle, said assembly comprising:
   a flexible panel having a bottom end, a top end, a pair of side edges, a first side and a second side;
   a rigid bracket being attached to and extending along a length of said top end, said bracket having a central portion and a pair of arms, said central portion abutting said top end and each of said arms abutting one of said first and second sides;
   a plurality of clamps, each of said clamps being attached to said bracket and extending upwardly away therefrom, each of said clamps including an actuator for selectively opening or closing said clamps, wherein each of said clamps are closed when said actuators are in a downward position located generally adjacent to said bracket and open when said actuators are spaced away from said brackets, each of said clamps being selectively coupled to the floor rail;
   a locking assembly for selectively locking said actuators in said downward position, said locking assembly including;
       an elongated member having a plurality of spaced apertures extending therethrough;
       a plurality of threaded posts, each of said posts being attached to and extending outwardly from a first of said arms, each of said posts being orientated perpendicular to a plane of said first arm, each of said posts being positioned for extending into one of said apertures; plurality of fasteners, each of said fasteners being removably coupled to one of said posts, each of said fasteners comprising a fly nut, wherein said elongated member may be selectively mounted on and secured to said posts such that said actuators are positioned between said elongated member and said bracket.

* * * * *